(12) United States Patent
Wilson

(10) Patent No.: US 12,109,925 B2
(45) Date of Patent: Oct. 8, 2024

(54) VENTILATED SEAT WITH PERFORATED ELECTROCONDUCTIVE FABRIC HEATING ELEMENTS

(71) Applicant: B/E Aerospace, Inc., Winston-Salem, NC (US)

(72) Inventor: Christopher M. Wilson, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/672,393

(22) Filed: Feb. 15, 2022

(65) Prior Publication Data

US 2023/0256877 A1 Aug. 17, 2023

(51) Int. Cl.
*A47C 7/74* (2006.01)
*B60N 2/56* (2006.01)

(52) U.S. Cl.
CPC ......... *B60N 2/5685* (2013.01); *B60N 2/5621* (2013.01)

(58) Field of Classification Search
CPC ............................. B60N 2/5685; B60N 2/5621
See application file for complete search history.

(56) References Cited

U.S. PATENT DOCUMENTS

| | | | |
|---|---|---|---|
| 7,468,332 B2 | 12/2008 | Avloni | |
| 7,714,255 B2 | 5/2010 | Augustine et al. | |
| 7,823,967 B2 | 11/2010 | Parnis et al. | |
| 10,259,359 B2 | 4/2019 | Kienzler | |
| 10,889,378 B1 * | 1/2021 | Wilson | B60N 2/5657 |
| 10,919,633 B1 * | 2/2021 | Wilson | B60N 2/5628 |
| 11,161,437 B2 * | 11/2021 | Wilson | B60N 2/56 |
| 11,378,309 B2 * | 7/2022 | Stahl | F25B 9/04 |
| 11,524,784 B2 * | 12/2022 | Udriste | B64D 11/0626 |
| 2008/0223841 A1 * | 9/2008 | Lofy | B60N 2/5678 219/202 |
| 2010/0327636 A1 | 12/2010 | Stoll et al. | |
| 2011/0226751 A1 * | 9/2011 | Lazanja | A47C 7/748 219/217 |
| 2017/0298567 A1 | 10/2017 | Abula | |
| 2020/0189229 A1 | 6/2020 | Palmer et al. | |
| 2021/0031926 A1 * | 2/2021 | Udriste | A47C 7/744 |
| 2021/0039530 A1 * | 2/2021 | Wilson | B60N 2/5685 |
| 2021/0039791 A1 * | 2/2021 | Wilson | B60N 2/5635 |
| 2021/0102733 A1 * | 4/2021 | Stahl | B60N 2/5657 |
| 2021/0315060 A1 | 10/2021 | Browa | |

OTHER PUBLICATIONS

Eeon Technology, https://marktek-inc.com/doc/EeonTexTDSF1, EeonTex™ Conductive Textiles, Downloaded Dec. 17, 2021, 2 pages.

* cited by examiner

*Primary Examiner* — Shin H Kim
(74) *Attorney, Agent, or Firm* — Suiter Swantz IP

(57) ABSTRACT

The present disclosure provides a climatized seat equipped with a ventilation system and a heating system for use separately or synergistically. The heating system includes electroconductive fabric sections having at least one perforation positioned in surrounding relation to a passageway formed in a seat element, for instance a cushion assembly. Each electroconductive fabric section includes conductors electrically coupled to a controller for activating the electroconductive fabric. The electroconductive fabric can be perforated to accommodate complex shapes, features and transitions associated with the surface to be heated and provides more direct and even heat distribution as compared to conventional resistive wires woven into fabric.

7 Claims, 3 Drawing Sheets

VENTILATED SEAT WITH PERFORATED ELECTROCONDUCTIVE FABRIC HEATING ELEMENTS

TECHNICAL FIELD AND BACKGROUND

The present disclosure relates generally to a climatized seat for use in a vehicle such as an aircraft, and more particularly to a climatized seat equipped with a ventilation system and a separate heating system including perforated electroconductive fabric sections.

Soft materials such as foam cushions and fabric dress covers are used to improve seat comfort. Over time, seats that suffer from a constant sitting position and heat build-up in the soft materials can become uncomfortable. Discomfort can be alleviated, at least in part, by incorporating adjustability into the seat. For example, aircraft passenger seats can be configured to adjust between upright and reclined positions. While premium class seats are designed to maximize adjustability, space and cost constraints in economy seating classes limit seats to fixed sitting positions or minimal backrest recline. A fixed or substantially fixed seat can cause pressure points and hot spots to form quickly and remain throughout the duration of a flight causing discomfort to the passenger.

Seat discomfort can be further alleviated by heating or cooling the seat. To heat a seat, conventional systems use electric resistive wires woven into fabrics to radiate heat to raise the surface temperature of the seat. To cool the seat, conventional systems use air ducts to flow conditioned air through the seat, typically through a perforated dress cover. Resistive wires cause difficulties in manufacturing due to the fabric construction and large number of wires and associated electrical connections needed for sufficient heating. Resistive wires also constrain the complexity of the seat design due to difficulties transitioning the wires between surfaces and around obstacles such as ventilation pathways. In addition, resistive wires are prone to breakage and tend to produce hot spots.

Accordingly, what is needed is a seat heating solution that works synergistically with a seat ventilation system while providing a more even distribution of heat, improved reliability, and freedom of seat design.

BRIEF SUMMARY OF THE INVENTION

To achieve the foregoing and other aspects, in a first embodiment the present disclosure provides a climatized seat including a seat cushion having at least one passageway configured to direct a flow of air through the seat cushion, a ventilation system fluidly coupled to the at least one passageway and configured to generate the flow of air, a heating system including an electroconductive fabric positioned on the seat cushion and including at least one perforation positioned in surrounding relation to an opening to the at least one passageway, and a controller operatively coupled to the ventilation system and the electroconductive fabric, the controller configured to independently activate each of the ventilation system and the heating system.

In some embodiments, the controller is configured to operate the climatized seat in a first operating condition in which the ventilation system is inactive and the heating system is inactive, and a second operating condition in which each of the ventilation system and the heating system are active.

In some embodiments, the at least one passageway is positioned internal to the seat cushion and the opening is positioned in a surface of the seat cushion.

In some embodiments, the electroconductive fabric is adhered to a surface of the seat cushion.

In some embodiments, the seat further includes a dress cover substantially encasing the seat cushion, wherein the electroconductive fabric is disposed between the dress cover and the seat cushion.

In some embodiments, the seat further includes a dress cover substantially encasing the seat cushion, wherein the electroconductive fabric is embedded in the dress cover.

In some embodiments, the seat further includes a conductive fastener coupled to the electroconductive fabric and electrically coupled to the controller.

In some embodiments, the electroconductive fabric is substantially encased in a waterproof package.

In some embodiments, the electroconductive fabric has a maximum size no greater than 8"×8".

According to another aspect, the present disclosure provides a climatized aircraft passenger seat including a seat bottom cushion including at least one passageway configured to direct a flow of air through the seat bottom cushion, a backrest cushion including at least one passageway configured to direct a flow of air through the backrest cushion, and a ventilation system fluidly coupled to the at least one passageway of each of the seat bottom cushion and the backrest cushion, the ventilation system configured to generate the flow of air through the seat bottom cushion and the backrest cushion. The seat further includes a heating system including a first electroconductive fabric positioned on the seat bottom cushion and a second electronic conductive fabric positioned on the backrest cushion, each of the first and second electroconductive fabrics including at least one perforation positioned in surrounding relation to an opening to the at least one passageway of the respective seat bottom and backrest cushions. A controller operatively coupled to the ventilation system and the first and second electroconductive fabrics is configured to independently activate each of the ventilation system and the first and second electroconductive fabrics.

In some embodiments, the controller is configured to operate the climatized seat in a first operating condition in which the ventilation system is inactive and the heating system is inactive, and a second operating condition in which each of the ventilation system and the heating system are active.

In some embodiments, a first dress cover substantially encases the seat bottom cushion and a second dress cover substantially encases the backrest cushion, wherein the first electroconductive fabric is disposed between the first dress cover and the seat bottom cushion and the second electroconductive fabric is disposed between the second dress cover and the backrest cushion.

In some embodiments, a first dress cover substantially encases the seat bottom cushion and a second dress cover substantially encases the backrest cushion, wherein the first electroconductive fabric is embedded within the first dress cover and the second electroconductive fabric is embedded within the second dress cover.

Embodiments of the present disclosure may include one or more or any combination of the above aspects, features and configurations.

BRIEF DESCRIPTION OF THE DRAWINGS

Implementations of the embodiments disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the exemplary embodiments disclosed herein are directed to climatization systems for heating, cooling or ventilating a seat, for instance an aircraft passenger seat. The climatization systems disclosed herein are compatible for use with various types of seat constructions such as vehicle passenger and crew seat constructions. The seat types disclosed herein are non-limiting examples of seats for use in vehicles such as aircraft, motor vehicles, buses, trains, boats, and any other vehicle type having a seat or seats benefitting from a seat conditioning and ventilation system. Seats may include climatized elements such as a backrests and seat bottoms, and optionally may include climatized elements such as armrests, leg rests, and headrests. Seat elements may further include separate or detached elements for use with a seat such as ottomans, footrests, consoles, etc.

In addition, the climatization systems disclosed herein can be incorporated into monuments such as furniture separate from or associated with a seat. The systems disclosed herein are compatible with both fixed and adjustable seats, such as seats adjustable between upright and reclined sitting positions. Seats can include rigid frame members providing structural support, cushion elements positioned over rigid elements providing comfort and flotation, and dress covers positioned over the cushion elements providing comfort, durability, and aesthetics. In other examples, composite and soft elements may be integrally formed and soft elements may achieve cushion and durability performance with a single element. The systems disclosed herein can be integrated into a seat construction regardless of adjustment and other capabilities of the seat. The climatization systems disclosed herein may work independently or synergistically in relation to a seat element.

Figure 1:
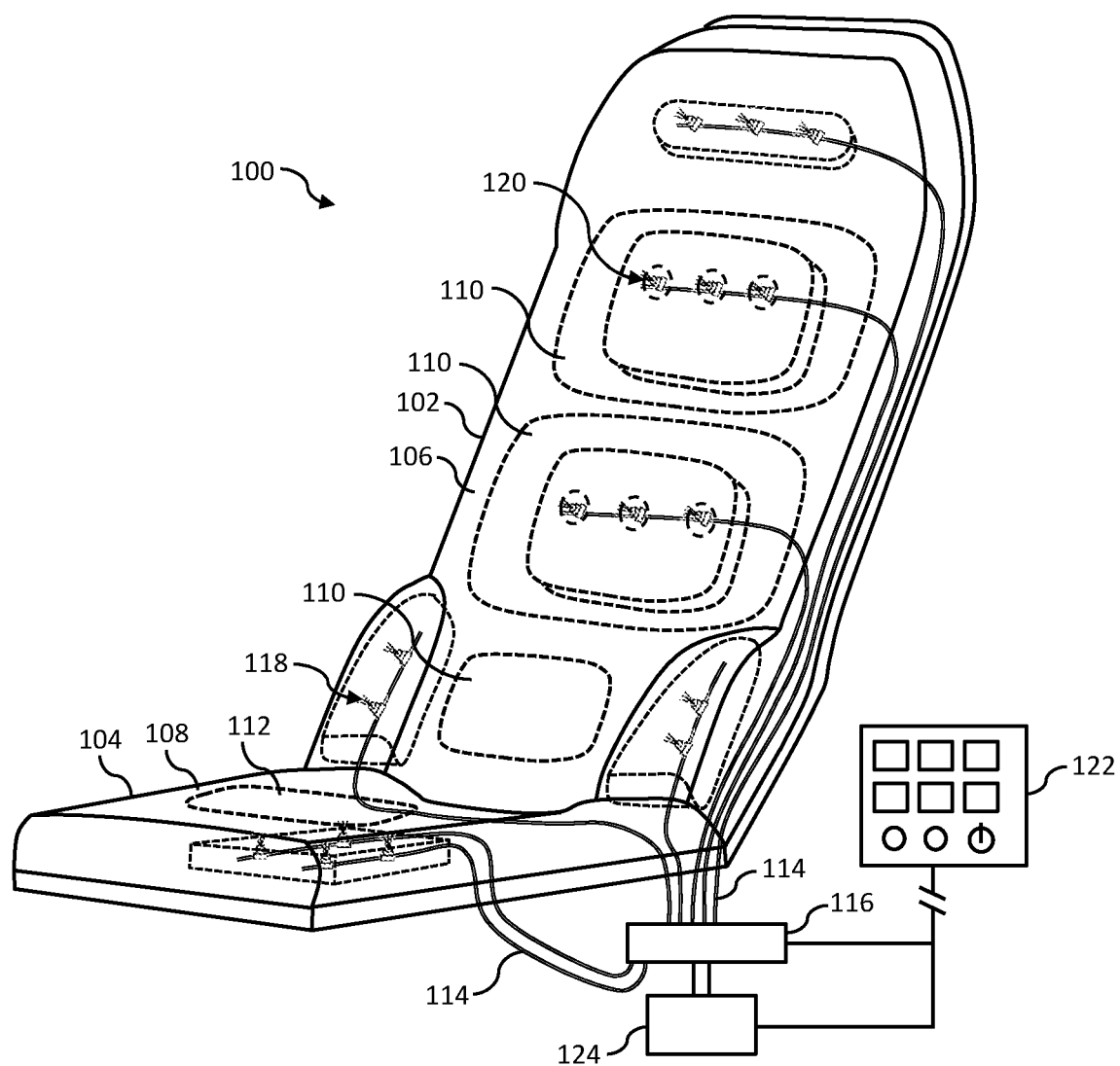
FIG. 1 is a perspective view of a seat system including separate ventilation and heating systems according to the present disclosure.

Referring to FIG. 1, a non-limiting example of a seat is shown at reference numeral 100. The seat 100 generally includes a backrest 102 and a seat bottom 104 coupled to and supported by a frame. The backrest 102 includes at least one cushion 106 and the seat bottom includes at least one cushion 108. The backrest and the seat bottom are separate and may be pivotally attached to allow the backrest to pivot or relative to the seat bottom to achieve a reclined sitting position. The cushions 106, 108 of each of the backrest 102 and the seat bottom 104 may include at least one of open cell foam for comfort and closed cell foam for flotation.

At least one structural element supports the backrest 102, while at least one separate structural element supports the seat bottom 104. Each structural element may be constructed from rigid materials such as composites or metal to support their respective assembly. Each cushion 106, 108 may be covered with a dress cover for comfort, performance, and aesthetics. Portions of the dress cover may be perforated to facilitate airflow therethrough.

The construction and configuration of the supportive elements is not limiting and may vary. For example, the elements may be continuous across the respective back and bottom of the seat or may be skeletal elements supporting a diaphragm. The elements may be pivotally coupled such that the angle therebetween can be changed, for example, increasing as the backrest reclines and decreasing as the seat moves toward upright. The elements may be pivotally connected or coupled to other frame elements such as spreaders. The angle of the backrest 102 may be adjusted and locked relative to the seat bottom 104. For example, in an economy class seat construction, a gas compression spring may act between the backrest 104 and its supporting element. In a premium class seat construction, a control panel may be electrically coupled to one or more seat actuators for driving component adjustability either alone or between discrete sitting positions. The climatization systems disclosed herein operate mutually exclusive of any seat adjustment system.

Each of the backrest cushion 106 and the seat bottom cushion 108 may include more than one type of material in the cushion construction. In some embodiments, the cushion assemblies may include one or more layers of open cell foam and closed cell flotation foam with fire-resistant layers or additives, referred to herein collectively as the "foam" portion of the cushion assemblies. Cushion assemblies may include spacer mesh positioned in predetermined zones. Spacer mesh may be a three-dimensional mesh like body attached to or affixed within the foam to prevent the spacer mesh from being displaced with respect to the foam body. In some embodiments, the spacer mesh is positioned in zones to be ventilated, with or without heat, and the foam is positioned outside of those zones. While both the foam and spacer mesh provide comfort and passenger support, the open cell structure of the spacer mesh allows comparatively more airflow therethrough. Some spacer mesh within the assembly may be positioned directly adjacent (e.g., beneath) a perforated portion of the dress cover. Other spacer mesh may be positioned internal to the cushion such as within an air column in which ambient air can be drawn in for adding/mixing with the pressurized air as described below.

Zones on the seat may correspond to points of likely passenger contact. For example, regarding the backrest 102, zones may be provided in one or more of a lower backrest or lumbar area, upper backrest area, side bolster areas, and a headrest area. Regarding the seat bottom 104, a zone may correspond to a central region of the seat bottom or other area. While the zones may correspond to areas of the cushion assembly likely to be in passenger contact in likely sitting positions, the zones may also be to one or more of the lateral sides and longitudinal ends in embodiments functioning to move air through the cushion assembly in general. Depending on the types of foam and spacer mesh, comfort differences between the two foam types may be imperceptible to the passenger, particularly when positioned beneath a dress cover. Each of the foam and the spacer mesh may be formed with contouring and concave portions to conform to passenger anatomy.

Portions of the spacer mesh adjacent the foam may be sealed to prevent air leakage. In some embodiments, the faces of the spacer mesh facing away from the passenger may also be sealed such that air contained in the spacer mesh is directed out through the unsealed face toward the passenger. In embodiments in which the spacer mesh is positioned in an air column in fluid communication with an ambient air supply, the faces of the spacer mesh intended to draw ambient air in may be unsealed, while the faces in contact with the spacer foam or support element may be sealed to direct air flow through the spacer mesh without leaking.

Each of the backrest 102 and the seat bottom 104 may be equipped with a heating system. In a preferred embodiment, the heating system includes electroconductive fabric sections positioned at or near the contact surface of the cushion. As shown, a plurality of separate electroconductive fabric sections 110 are positioned in relation to the backrest cushion 106 and at least one electroconductive fabric section 112 is positioned in relation to the seat bottom cushion 108. In some embodiments, each electroconductive fabric section is adhered to its respective cushion element.

Each of the backrest 102 and the seat bottom 104 may be equipped with both a ventilation system and a heating system according to present disclosure. While the ventilation system is directed to flow air through the seat, conditioned or otherwise, the heating system is configured to heat the seat, and particularly the cushion surface and also the overlying dress cover. For ventilation, each of the backrest cushion 106 and the seat bottom cushion 108 may include or define at least one passageway or conduit 114 for directing air from a ventilation source 116 to an opening 118 formed through the cushion. In some embodiments, the air is directed through a plurality of devices positioned in the seat, as discussed further below. The at least one passageway may be internal to the seat cushion or may be formed, at least in part, as a trench formed in the surface of the cushion. The at least one passageway 114 is configured to direct flowing air originating from the air supply, through the seat cushion, and out through at least one opening formed in the surface of the cushion. In the case of a dress cover, perforations are preferably positioned proximate the openings in the cushion to facilitate air flow from the seat.

The heating system, configured as at least one electroconductive fabric sheet, is disposed on the cushion. At least one perforation 120 is provided in the electroconductive fabric positioned in surrounding relation to a respective one of the openings 118. In the case of multiple passageways in each cushion terminating in multiple openings, the electroconductive fabric is provided with a plurality of perforations each positioned surrounding one of the openings. In this configuration, the perforations are provided so that the electroconductive fabric can be provided as a sheet with voids so that the air flow through the openings is not obstructed. As compared to electric resistive wires that must remain intact while being routed around obstructions, such as openings, the electroconductive fabric can be perforated or punched while remaining operative.

When the electroconductive fabric is heated, the edges formed around the opening are heated such that heated air at the perforation/opening interface is heated. Air flowing through the at least one passageway and exiting through the opening is heated such that the expelled air has an increased temperature as compared to the generated air flow at the ventilation device. As such, the heating system can be used to radiate heat the cushion without any flow of air through the cushion and/or heat air flowing through the cushion.

In some embodiments, a controller 122 is operably coupled to the ventilation and heating systems and is optionally configured to receive signals from at least one temperature sensor, and responsive to sensor signals electrically activate or deactivate the ventilation system and/or heating system. The heating system can be activated through the controller 122 on demand such as by a user controlling the seat conditioning feature. The controller 122 may also automatically electrically activate or deactivate the heating system, each electroconductive fabric section individually or collectively, by supplying current or discontinuing current to the electrical conductors of the fabric sections, as discussed further below.

System control may be based on predetermined temperatures or temperature ranges, exceeding upper and lower threshold temperatures, approaching upper and lower threshold temperatures, maximum temperatures, time-based programming, or any other temperature or safety protocol. The controller 122 may also be operably coupled to the ventilation system, turning the system on and off and adjusting air pressure, fan speed, etc., based on some of the same protocols. In some embodiments, the controller 122 is communicatively coupled to an air supply 124.

In a non-limiting example, the controller 122 may be configured to operate in at least to different operating modes. In some embodiments, the controller 122 may operate in a first mode in which one of the ventilation system and the heating system is active, and a second mode in which both systems are active. The first operating mode may correspond to a seat ventilation condition in which a seat element is ventilated using generated air flow at ambient temperature, and the second operating condition may correspond to a seat conditioning in which a seat element is heated using generated air flow at a temperature above ambient air temperature. Other operating conditions are possible such as heating predetermined zones while ventilating others without heat.

In some embodiments, the controller 122 communicates with temperature sensors to activate the systems in response to sensed conditions, such as a predetermined threshold temperatures in one of the zones to avoid passenger discomfort automatically and proactively. Each sensor may be a device or a subsystem capable of detecting condition changes within the seat assembly and with a processor within or in communication with the controller. The system sensors relay information to the processor where processing logic analyzes the data received to control the systems. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications.

Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide area network (WAN), a local area network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

In some embodiments, the electroconductive fabric suitable for obtaining conductivity may be woven fabric, nonwoven fabric, natural fabric such as cotton, wool, and silk, synthetic fabric such as nylon, polyester, polypropylene, Kevlar, and lycra-spandex, fabric that contains both natural and synthetic fiber, or inorganic material fabric such as glass fiber fabric, quartz fiber fabric, etc. The fabric is preferably pretreated to ensure more efficient penetration of chemical components into the fabric structure and bonding, and subsequently treated with a predetermined layered deposition technique, for example, alternating treatment in two liquid media such as a solution of an anionic or cationic polymer and a suspension of charged conductive nanoparticles and/or conductive polymer.

Each electroconductive fabric section is provided with conductors, with each conductor coupled to a conductive fastener. To maximize performance, each electroconductive fabric section preferably has a maximum size of about 144 $in^2$ (i.e., about 900 $cm^2$), more preferably about 64 $in^2$ (i.e., about 400 $cm^2$). Thus, the seat bottom and backrest may be provided with multiple separate sections adequately sized to cover the contact area wherein each individual section does not exceed the foregoing dimensions.

Figure 2:
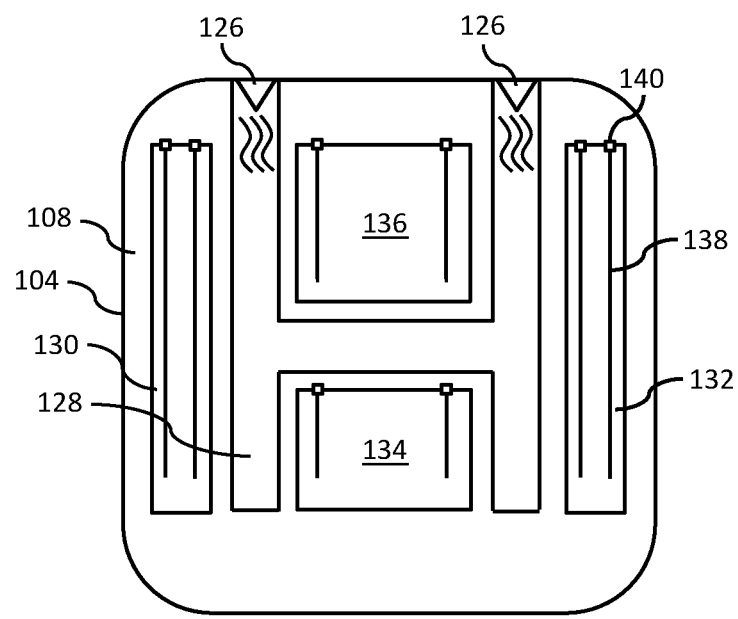
FIG. 2 is a top view of a seat bottom showing a heating system including electroconductive fabric sections adhered to the seat cushion and positioned in proximity to ventilation channels formed in the cushion.

Referring to FIG. 2, the seat bottom 104 according to an embodiment of the present disclosure includes a cushion assembly 108. The cushion assembly 108 is shown with the dress cover removed, which in some embodiments may be perforated. As shown, the ventilation system includes air movers 126 configured to direct a flow of air through a network of channels 128 defined in the cushion assembly, either at the surface or provided at depth in the cushion. In some embodiments, the air movers 126 may be Venturi or fan devices positioned at the back of the cushion assembly configured to direct air for ventilation toward a forward end of the cushion.

The heating component of the assembly includes separate electroconductive fabric sections provided as left and right side sections 130, 132 and front and back center sections 134, 136. The side sections 130, 132 may be generally narrow and elongated as compared to the generally rectangular center sections 134, 136. Each electroconductive fabric section 130, 132, 134, 136 includes a pair of spaced conductors 138 electrically coupled to a pair of respective conductive fasteners 140 electrically coupled to a power source, for instance the controller. In the configuration shown, the primary contact areas of the seat bottom are provided with electroconductive fabric while adjacent air flow areas remain unobstructed.

Figure 3:
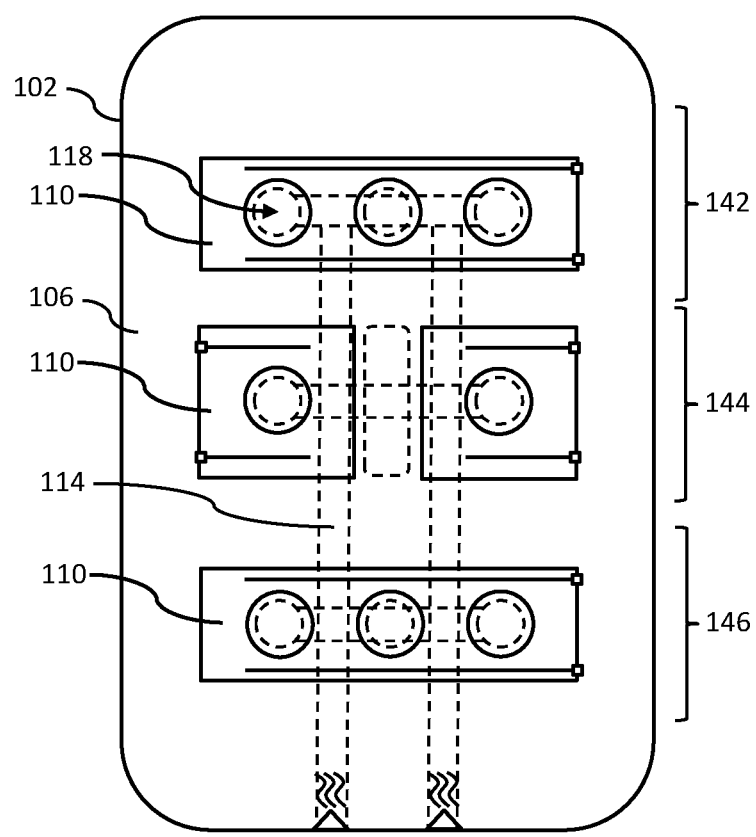
FIG. 3 is a front view of a backrest equipped with a heating system including perforated electroconductive fabric sections positioned in surrounding relation to ventilation openings formed in the backrest cushion.

Referring to FIG. 3, the backrest 102 according to an exemplary embodiment may be divided into a plurality of ventilated and heated zones, for instance an upper zone 142, a middle zone 144, and a lower zone 146, corresponding to the upper, middle and lower back of a seat occupant. Ventilation may be provided in each section via a plurality of openings 118 fluidly coupled via a network of passageways 114 formed in the backrest cushion 106. At least one electroconductive fabric section 110 is positioned in each of the upper, middle and lower zones 142, 144, 146. Each electroconductive fabric section 110 includes a pair of spaced conductors and conductive fasteners as discussed above. Each electroconductive fabric section is perforated at each opening 118 so as not to obstruct air flow. The perforations are positioned in surrounding relation to the openings 118 such that heat can transfer from the surrounding electroconductive fabric to the air flowing through the opening. Each electroconductive fabric section is continuous such that the flow of electrons from the conductors occurs around the perforations, thus the electroconductive fabric sections can be cut to form complex shapes to accommodate any cushion configuration.

In some embodiments, the electroconductive fabric sections are adhered directly to the surface of the cushion. In some embodiments, a dress cover stack-up for the seat elements in which the electroconductive fabric is embedded generally includes a fabric covering or dress cover, at least one insulative or fire-blocking layer, and the electroconductive fabric. The electroconductive fabric may be adhered to the adjacent layer, for example, by adhesive bonding.

Regardless of the disposition of the electroconductive fabric, the electroconductive fabric is preferably provided in a waterproof package and the waterproof package may be adhered to the adjacent dress cover layer or the cushion.

Regarding the ventilation system, an air flow generator may be positioned to draw air from an air column formed in the seat or from outside of the seat. In a non-limiting example, the air column, which may be filled with spacer mesh, is in fluid communication with ambient air from above or below the air column in the case of the backrest such that ambient air is drawn from outside the seat assembly in through the air column. Ambient air at ambient temperature may be drawn from behind the backrest structural element from the area immediately behind the seat. In the case of the seat bottom, ambient air at ambient temperature may be drawn from an air column formed between the seat bottom cushion assembly and a seat pan or from below the seat pan, among other locations. Drawing ambient air from outside the seat assembly as opposed to drawing trapped air from within the seat assembly provides a lower ambient air temperature.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A climatized seat, comprising:
   a seat cushion including at least one passageway configured to direct a flow of air through the seat cushion to at least one opening positioned at a surface of the seat cushion;
   a ventilation system fluidly coupled to the at least one passageway and configured to generate the flow of air;
   a heating system including an electroconductive fabric positioned on the seat cushion and including at least one perforation positioned in surrounding relation to the at least one opening to the at least one passageway;
   a controller operatively coupled to the ventilation system and the electroconductive fabric, the controller configured to independently activate each of the ventilation system and the heating system; and
   a dress cover;
   wherein the electroconductive fabric is disposed between the dress cover and the seat cushion,
   wherein the electroconductive fabric is implemented as a sheet adhered to the seat cushion; and
   wherein the at least one passageway is positioned internal to the seat cushion and the at least one opening is positioned at the surface of the seat cushion.

2. The climatized seat according to claim 1, wherein the controller is configured to operate the climatized seat in a first operating condition in which the ventilation system is inactive and the heating system is inactive, and a second operating condition in which each of the ventilation system and the heating system are active.

3. The climatized seat according to claim 1, further comprising a conductive fastener coupled to the electroconductive fabric and electrically coupled to the controller.

4. The climatized seat according to claim 1, wherein the electroconductive fabric is substantially encased in a waterproof package.

5. The climatized seat according to claim 1, wherein the electroconductive fabric has a maximum size no greater than 8"×8".

6. A climatized aircraft passenger seat, comprising:
   a seat bottom cushion including at least one passageway configured to direct a flow of air through the seat bottom cushion to at least one opening positioned at a surface of the seat bottom cushion;
   a backrest cushion including at least one passageway configured to direct a flow of air through the backrest cushion to at least one opening positioned at a surface of the backrest cushion;
   a ventilation system fluidly coupled to the at least one passageway of each of the seat bottom cushion and the backrest cushion, the ventilation system configured to generate the flow of air through the seat bottom cushion and the backrest cushion;
   a heating system including a first electroconductive fabric positioned on the seat bottom cushion and a second electronic conductive fabric positioned on the backrest cushion, each of the first and second electroconductive fabrics including at least one perforation positioned in surrounding relation to the at least one opening to the at least one passageway of the respective seat bottom and backrest cushions;
   a controller operatively coupled to the ventilation system and the first and second electroconductive fabrics, the controller configured to independently activate each of the ventilation system and the first and second electroconductive fabrics;
   a first dress cover covering the seat bottom cushion; and
   a second dress cover covering the backrest cushion;
   wherein the first electroconductive fabric is implemented as a sheet adhered to the seat bottom cushion or embedded within the first dress cover, and the second electroconductive fabric is implemented as a sheet adhered to the backrest cushion or embedded within the second dress cover; and
   wherein the at least one passageway of each of the seat bottom cushion and the backrest cushion is positioned internal to the respective one of the seat bottom cushion and the backrest cushion, and the at least one opening is positioned in the surface of the respective one of the seat bottom cushion and the backrest cushion.

7. The climatized seat according to claim 6, wherein the controller is configured to operate the climatized seat in a first operating condition in which the ventilation system is inactive and the heating system is inactive, and a second operating condition in which each of the ventilation system and the heating system are active.

* * * * *